(12) United States Patent
Uhler

(10) Patent No.: US 7,185,183 B1
(45) Date of Patent: Feb. 27, 2007

(54) ATOMIC UPDATE OF CPO STATE

(75) Inventor: G. Michael Uhler, Menlo Park, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 534 days.

(21) Appl. No.: 09/921,400

(22) Filed: Aug. 2, 2001

(51) Int. Cl.
G06F 9/48 (2006.01)

(52) U.S. Cl. ........................ 712/224; 712/244

(58) Field of Classification Search ............... 712/229, 712/224, 244
See application file for complete search history.

(56) References Cited

U.S. PATENT DOCUMENTS

| | | | |
|---|---|---|---|
| 3,828,327 A | | 8/1974 | Berglund et al. |
| 4,400,769 A | * | 8/1983 | Kaneda et al. ............... 710/267 |
| 4,949,238 A | | 8/1990 | Kamiya |
| 5,109,849 A | | 5/1992 | Goodman et al. |
| 5,148,544 A | | 9/1992 | Cutler et al. |
| 5,210,874 A | * | 5/1993 | Karger ........................ 719/328 |
| 5,345,567 A | * | 9/1994 | Hayden et al. ............... 712/228 |
| 5,381,540 A | * | 1/1995 | Adams et al. ................ 710/49 |
| 5,572,704 A | | 11/1996 | Bratt et al. |
| 5,623,636 A | | 4/1997 | Revilla et al. |
| 5,632,025 A | | 5/1997 | Bratt et al. |
| 5,655,135 A | * | 8/1997 | Sholander et al. .......... 711/100 |
| 5,701,493 A | | 12/1997 | Jagger |
| 5,701,501 A | | 12/1997 | Gandhi |
| 5,740,451 A | | 4/1998 | Muraki et al. |
| 5,742,780 A | | 4/1998 | Caulk, Jr. |
| 5,764,969 A | * | 6/1998 | Kahle et al. ................. 712/228 |
| 5,768,599 A | | 6/1998 | Yokomizo |
| 5,805,918 A | * | 9/1998 | Blomgren et al. ............ 712/43 |
| 5,887,175 A | * | 3/1999 | Col et al. .................... 710/260 |
| 5,911,065 A | | 6/1999 | Williams et al. |
| 6,061,709 A | | 5/2000 | Bronte |
| 6,249,881 B1 | | 6/2001 | Porten et al. |
| 6,282,657 B1 | | 8/2001 | Kaplan et al. |
| 6,341,324 B1 | | 1/2002 | Caulk et al. |
| 6,393,556 B1 | | 5/2002 | Arora |
| 6,397,379 B1 | | 5/2002 | Yates et al. |

(Continued)

OTHER PUBLICATIONS

Intel, IAPX88 Book with an introduction to the IAPX88, 1983, Intel, pp. 2-1 to 2-17, 2-64, 2-154, 47, 48 to 49, 62,63.*
RISC Microprocessor Databook, 32-Bit TX System RISC TX39 Family TX39/H2 Processor Core, Chapters 1-8, Appendix A, Doc. ID 4412D-9908 (1998).

(Continued)

Primary Examiner—Eric Coleman
(74) Attorney, Agent, or Firm—James W. Huffman

(57) ABSTRACT

A group of bit set and bit clear instructions are provided for a microprocessor to allow atomic modification of privileged architecture control registers. The bit set and bit clear instructions include an opcode that designates to the microprocessor that the instructions are to execute in privileged (kernel) state only, and that the instructions are to communicate with privileged control registers. Two operands are provided for the instructions, the first designating which of the privileged control registers is to be modified, the second designating a general purpose register that contains a bit mask. The bit set instructions set bits in the designated control register according to bits set in the bit mask. The bit clear instructions clear bits in the designated control register according to bits set in the bit mask. By atomically modifying privileged control registers, a requirement for strict nesting of interrupt routines is eliminated.

21 Claims, 7 Drawing Sheets

U.S. PATENT DOCUMENTS

| | | | |
|---|---|---|---|
| 6,496,912 | B1 | 12/2002 | Fields, Jr. et al. |
| 6,532,533 | B1 * | 3/2003 | Bhandal et al. ............. 712/225 |
| 6,560,698 | B1 * | 5/2003 | Mann ......................... 712/248 |
| 6,666,383 | B2 * | 12/2003 | Goff et al. .................. 235/492 |
| 6,732,298 | B1 | 5/2004 | Murthy et al. |
| 6,763,450 | B1 | 7/2004 | Miyaguchi et al. |
| 6,772,326 | B2 | 8/2004 | Chauvel et al. |
| 6,779,065 | B2 | 8/2004 | Murty et al. |
| 6,820,153 | B2 | 11/2004 | Yanagi et al. |
| 6,842,811 | B2 | 1/2005 | Barry et al. |
| 2002/0016883 | A1 | 2/2002 | Musoll et al. |

OTHER PUBLICATIONS

Toshiba Data sheet List;http://www.seicon.toshiba.co/jp/eng/prd/micro/td/td_all.html; Toshiba Semiconductor Company.

Alpha Architecture Handbook (Oct. 1996). pp 11-2 and C-20.

CompactRISC CR16A Programmer's Reference Manual (Feb. 1997); pp 2-6, 3-3, 5-12, and 5-13.

Richard L. Sites, Richard T. Witek, Alpha AXP Architecture Reference Manual Second Edition, Copyright 1995, p. 2-19.

David L. Weaver et al. *"The SPARC Architeture Manual,"* Version 9. SPARC International, Inc. 1994.

Alpha Architecture Handbook (Oct. 1996). Digital Equipment Corportation, Maynard, Massachusetts.

* cited by examiner

STATUS REGISTER FORMAT

| Mnemonic | Function |
| --- | --- |
| BICC0 | Bit Clear Coprocessor Zero |
| BISC0 | Bit Set Coprocessor Zero |
| DBICC0 | Doubleword Bit Clear Coprocessor Zero |
| DBISC0 | Doubleword Bit Set Coprocessor Zero |

Figure 7

Bit Clear to Coprocessor 0 — 700

| 31 26 | 25 21 | 20 16 | 15 11 | 10 | 3 2 | 0 |
|---|---|---|---|---|---|---|
| COP0 010000 | MT 00100 | rt | rd | lop 01 | 0 0 0000 0 | sel |
| 6 | 5 | 5 | 5 | 2 | 6 | 3 |

Bit Set to Coprocessor 0 — 702

| 31 26 | 25 21 | 20 16 | 15 11 | 10 | 3 2 | 0 |
|---|---|---|---|---|---|---|
| COP0 010000 | MT 00100 | rt | rd | lop 10 | 0 0 0000 0 | sel |
| 6 | 5 | 5 | 5 | 2 | 6 | 3 |

Double Bit Clear to Coprocessor 0 — 704

| 31 26 | 25 21 | 20 16 | 15 11 | 10 | 3 2 | 0 |
|---|---|---|---|---|---|---|
| COP0 010000 | MT 00101 | rt | rd | lop 01 | 0 0 0000 0 | sel |
| 6 | 5 | 5 | 5 | 2 | 6 | 3 |

Double Bit Set to Coprocessor 0 — 706

| 31 26 | 25 21 | 20 16 | 15 11 | 10 | 3 2 | 0 |
|---|---|---|---|---|---|---|
| COP0 010000 | MT 00101 | rt | rd | lop 10 | 0 0 0000 0 | sel |
| 6 | 5 | 5 | 5 | 2 | 6 | 3 |

ATOMIC UPDATE OF CP0 STATE

CROSS REFERENCE TO RELATED APPLICATION(S)

This application is related to U.S. patent application Ser. No. 09/921,377 entitled "READ ONLY ACCESS TO CP0 REGISTER" assigned to MIPS Technologies, Inc.

FIELD OF THE INVENTION

This invention relates in general to the field of computer architecture, and more specifically to a method and apparatus for atomically updating privileged architecture registers within a microprocessor.

BACKGROUND OF THE INVENTION

A microprocessor is a digital device that is utilized to execute instructions defined within a computer program. Such instructions include adding two data values together, comparing data values, moving data from one location to another, etc. In addition, a microprocessor is designed to communicate with other devices, such as network controllers, disk drives, keyboards, displays, etc., that are external to it. Typically, such external devices request the attention of the microprocessor by signaling one of several interrupt lines on the microprocessor. When this occurs, the microprocessor halts program execution, runs a special program called an "exception handler" to determine which device requested the interrupt, and what the nature of the interrupt is. Once the microprocessor has determined the nature of the interrupt, it executes an interrupt routine that is specific to the nature of the interrupt. Upon completion, the microprocessor typically returns to the program it was executing before the interrupt occurred.

One skilled in the art will appreciate that the above description of interrupt handling is very simplistic. That is, it has not considered the difference between hardware interrupts, software interrupts, internal exceptions, etc., nor has it considered what occurs when multiple interrupts occur simultaneously, or when a second interrupt occurs during processing of a first interrupt. However, the way a microprocessor handles an interrupt is, in many ways, dependent on the specific architecture of the microprocessor. For purposes of illustrating the present invention, an interrupt problem will be described with particular reference to the architecture of MIPS32™ and MIPS64™ microprocessors (hereinafter MIPS® microprocessors) designed by MIPS Technologies, Inc. of Mountain View, Calif.

More specifically, like many modern microprocessors, MIPS microprocessors contain privileged control registers that are updated during events such as interrupts and exceptions. These control registers are not directly accessible by user programs that execute on the microprocessors. Rather, when an interrupt or exception occurs, program execution is halted, and a special program, called an exception handler, is run which accesses the control registers, both to determine the nature of the interrupt, and to set or clear bits within one or more of the control registers, which control how the interrupt will be handled. (Note: The exception handler typically resides within an area of memory that can only be accessed by the microprocessor if it is in "kernel" mode. That is, to prevent user programs from accessing or changing the contents of the privileged control registers, a task switch must first occur which authorizes the execution of the exception handler, and thus access to the control registers.) Once the exception handler has read the appropriate control registers, and established how the interrupt will be handled, an interrupt service routine is used to service the interrupt. Upon completion of servicing the interrupt, the exception handler returns execution to the user program.

A particular control register within a MIPS microprocessor is called the Status Register (SR). The SR contains a number of bit fields that may be examined, and set or cleared, during handling of an interrupt. Like most control registers, the SR register cannot be modified directly. Rather, the process for examining and modifying the contents of the SR register involves the steps of: 1) Reading the contents of the SR register into one of the general purpose registers within the microprocessor; 2) Modifying, or setting/clearing particular bits within the general purpose register that contains the contents of the SR register; and 3) Writing the modified contents of the general purpose register back into the SR register. This three-step process is referred to as a R-M-W sequence, and is often required during interrupt processing.

Sample program code that performs this R-M-W sequence is shown below:

| Label | Instruction | Operands |
|-------|-------------|----------|
| 1:    | mfc0        | t0,SR    |
|       | or          | t0, things_to_set |
|       | and         | t0, things_to_preserve |
| 2:    | mtc0        | t0,SR    |

The first instruction "mfc0" causes the microprocessor to move the contents of the SR register into a general purpose register designated t0. This is the read cycle. The next two instructions "or" and "and" set or preserve particular bits within the t0 register, corresponding to the "things_to_set" mask, or the "things_to_preserve" mask. This is the modify cycle. The fourth instruction "mtc0" causes the microprocessor to move the contents of the t0 register back into the SR register. This is the write cycle. Specifics relating to which of the SR bits are modified during an interrupt, and how the above instructions operate, may be found in the MIPS32 or MIPS64 architecture specifications, which are available from MIPS Technologies, Inc., and incorporated herein by reference for all purposes.

During execution of an interrupt service routine, it may be desirable to perform the above described R-M-W sequence. One problem that exists is that the R-M-W sequence may itself be interrupted. For example, suppose that the R-M-W sequence described above is executing in response to a first interrupt. Further, suppose a second interrupt occurs between label 1 and label 2 above. The processor might halt execution of this R-M-W sequence and begin servicing the second interrupt. Now, suppose that while servicing the second interrupt, the contents of the SR register are changed. Upon return from servicing the second interrupt, the code at label 2 will write its altered value into SR, but will lose any changes made to the SR register by the second interrupt routine. Such a situation is unacceptable since changes to the SR register cannot be ignored.

In response to the above problem, several solutions have been developed to prevent changes in the SR register from being lost or ignored. A first solution is to simply disable all interrupts prior to performing the R-M-W sequence above. However, this situation is a catch-22, because in order to disable interrupts, interrupt mask bits in the SR register must be cleared, the clearing of which requires the same R-M-W sequence! What happens if an interrupt occurs while executing the R-M-W sequence that disables interrupts? One method of solving this problem is to insist that no interrupt change the value of SR during execution of any interrupt code. That is, by requiring that all interrupt code begin by saving off the value of SR, and end by restoring the saved value of SR back into SR, it can be assured that the SR value doesn't change. In many environments, however, this is considered too restrictive, as well as too time consuming. Moreover, in operating environments where interrupt routines are not strictly nested, you can never be sure you return to the spot where the proper SR value can be restored.

A second solution is to use a system call to disable interrupts. A system call works by causing an exception that disables interrupts in a single cycle. Then, the R-M-W sequence can proceed without risk of interruption. Many programmers consider use of a system call, to simply overcome the inherent problems of updating the SR register, overly dramatic, and again, too time consuming.

Therefore, what is needed is a mechanism that allows a programmer to set or clear bits within a control register of a processor, while guaranteeing that the modification process is not interrupted.

Furthermore, what is needed is a method and apparatus that sets or clears selected portions of a privileged control register atomically (i.e., within a single non-interruptible instruction). By modifying control bits atomically, the above presented problems associated with the R-M-W sequence are solved without imposing any additional processing delays, and without insisting that interrupt routines be strictly nested.

SUMMARY

The present invention provides a method and apparatus for atomically modifying privileged architecture control registers when a microprocessor is in a privileged state.

In one aspect, the present invention provides a microprocessor with a control register that is modifiable by a privileged (kernel) instruction, where the control register has bit fields. The microprocessor includes a core, to receive the privileged instruction and to modify the control register upon execution of the privileged instruction. The privileged instruction includes: an opcode and first and second operands. The opcode identifies the instruction as a privileged instruction. The first operand specifies the control register as a register to be modified. The second operand specifies a location of a second register within the microprocessor, the second register containing a bit mask, the bit mask determining which of the bit fields within the control register are to be modified. The bit mask is used to set or clear the bit fields in the control register atomically.

In another aspect, the present invention provides a method for atomically modifying interrupt mask bits within a privileged control register of a microprocessor. The method includes: providing a privileged instruction which instructs the microprocessor to clear particular ones of the interrupt mask bits; providing a bit mask, for specifying which of the particular ones of the interrupt mask bits are to be cleared; and upon receipt of an interrupt by the microprocessor, atomically clearing the particular ones of the interrupt mask bits as specified by the bit mask.

In yet another aspect, the present invention provides a bit clear instruction to execute on a microprocessor that has a privileged control register, where the bit clear instruction executes on the microprocessor when the microprocessor receives an interrupt and when the microprocessor is in a privileged state. The bit clear instruction includes a plurality of opcode bits to designate the bit clear instruction as a privileged instruction; a plurality of first operand bits to designate the privileged control register as the register to be operated upon by the bit clear instruction; and a plurality of second operand bits to designate a general purpose register as a register containing a bit mask, where the bit mask specifies which of a plurality of bits within the privileged control register are to be cleared. When the bit clear instruction executes on the microprocessor, the plurality of bits within the privileged control register that are specified by the bit mask are cleared, atomically.

In a further aspect, the present invention provides a computer program product for use with a computing device. The computer program product includes a computer usable medium, having computer readable program code embodied in the medium, to cause a microprocessor having a control register that is modifiable by a privileged instruction to be described. The computer readable program code includes first program code to provide a core, to receive the privileged instruction and to modify the control register upon execution of the privileged instruction. The computer readable program code also includes second program code to provide the privileged instruction, the privileged instruction including an opcode and two operands. The opcode identifies the instruction as a privileged instruction. The first operand specifies the control register as a register to be modified. The second operand specifies a location of a second register within the microprocessor, the second register containing a bit mask, the bit mask determining which of the bit fields within the control register are to be modified, where the bit mask is used to set or clear the bit fields in the control register. The bit fields in the control register are modified atomically by the privileged instruction.

In yet another aspect, the present invention provides a computer data signal embodied in a transmission medium. The data signal includes computer-readable first program code to provide a bit clear instruction for execution on a microprocessor having a privileged control register, the bit clear instruction executing on the microprocessor when the microprocessor receives an interrupt and when the microprocessor is in a privileged state. The first program code includes: a) program code to provide a plurality of opcode bits for designating the bit clear instruction as a privileged instruction; b) program code for providing a plurality of first operand bits for designating the privileged control register as the register to be operated upon by the bit clear instruction; and c) program code for providing a plurality of second operand bits for designating a general purpose register as a register containing a bit mask, the bit mask specifying which of a plurality of bits within the privileged control register are to be cleared. When the bit clear instruction executes on the microprocessor, the plurality of bits within the privileged control register that are specified by the bit mask are cleared, atomically.

Other features and advantages of the present invention will become apparent upon study of the remaining portions of the specification and drawings.

BRIEF DESCRIPTION OF THE DRAWINGS

FIG. 7 is a block diagram illustrating the bit architecture for the four atomic update instructions of FIG. 6.

DETAILED DESCRIPTION

Figure 1:
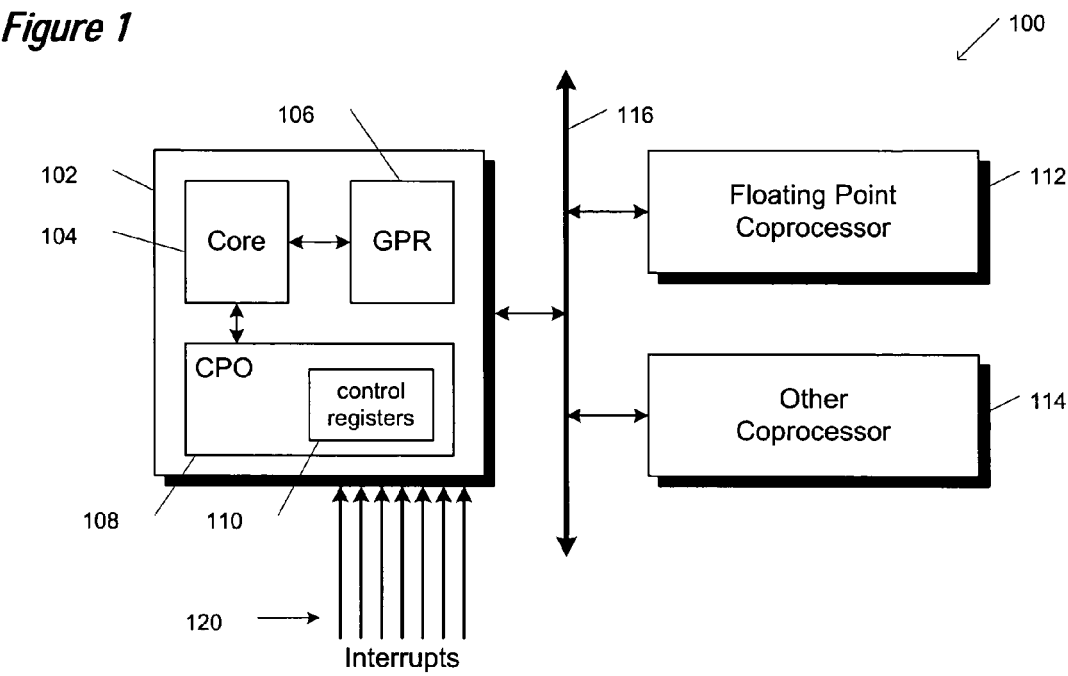
FIG. 1 is a block diagram of a microprocessor coupled to coprocessors according to the present invention.

Referring to FIG. 1, a block diagram 100 is shown illustrating a microprocessor (or CPU) 102 coupled to a floating point Coprocessor 112 and a second Coprocessor 114 via an interface bus 116. In one embodiment, the second Coprocessor 114 may be a graphics Coprocessor, an audio Coprocessor, or any other Coprocessor capable of executing instructions not designed specifically for the CPU 102. The CPU 102 includes an execution core 104, coupled to a general purpose register file (GPR) 106 for receiving instructions from memory (or a cache) and for execution of CPU 102 instructions. When floating point instructions are presented to the core 104, it provides those instructions to the floating point coprocessor 112 for execution. When instructions are presented to the core 104 that are designed for the second Coprocessor 114, the CPU 102 provides those instructions to the second Coprocessor 114. While the present invention is not restricted to any specific CPU, for purposes of discussion, the invention will be described with reference to the MIPS 32 and 64 bit processor architectures, available from MIPS Technologies, Inc. of Mountain View, Calif.

In addition to its normal computational functions, the CPU 102 includes a control unit to handle interrupts 120, configuration options e.g., such as the endianness of data, and observing or controlling on-chip functions like caches and timers. The control unit within the CPU 102 for performing such tasks is called Coprocessor 0 108, or CP0. CP0 108 is coupled to control registers 110 which contain values that set how the CPU 102 is to operate. For a listing of the control registers 110 within the MIPS 32/64 bit architecture, reference is made to Table 1 below. A complete description of each of these registers may be found in the MIPS32 and MIPS64 architecture Specifications, which are available from MIPS Technologies, Inc., and which are incorporated herein by reference for all purposes.

CP0 provides an abstraction of the functions necessary to support an operating system: exception handling, memory management, scheduling, and control of critical resources. The interface to CP0 is through various instructions encoded with a COP0 opcode, including the ability to move data to and from the control registers 110. The control registers 110 and the interaction with them make up what is called the Privileged Resource Architecture.

TABLE 1

| Register Number | Sel | Register Name | Function |
|---|---|---|---|
| 0 | 0 | Index | Index into the TLB array |
| 1 | 0 | Random | Randomly generated index into the TLB array |
| 2 | 0 | EntryLo0 | Low-order portion of the TLB entry for even-numbered virtual pages |
| 3 | 0 | EntryLo1 | Low-order portion of the TLB entry for odd-numbered virtual pages |
| 4 | 0 | Context | Pointer to page table entry in memory |
| 5 | 0 | PageMask | Control for variable page size in TLB entries |
| 6 | 0 | Wired | Controls the number of fixed ("wired") TLB entries |
| 7 | All | | Reserved for future extensions |
| 8 | 0 | BadVAddr | Reports the address for the most recent address-related exception |
| 9 | 0 | Count | Processor cycle count |
| 10 | 0 | EntryHi | High-order portion of the TLB entry |
| 11 | 0 | Compare | Timer interrupt control |
| 12 | 0 | Status | Processor status and control |
| 13 | 0 | Cause | Cause of last general exception |
| 14 | 0 | EPC | Program counter at last exception |
| 15 | 0 | PRId | Processor identification and revision |
| 16 | 0 | Config | Configuration register |
| 16 | 1 | Config1 | Configuration register 1 |
| 17 | 0 | LLAddr | Load linked address |
| 18 | 0–n | WatchLo | Watchpoint address |
| 19 | 0–n | WatchHi | Watchpoint control |
| 20 | 0 | XContext | XContext in 64-bit implementations |
| 21 | All | | Reserved for future extensions |
| 22 | All | | Available for implementation dependent use |
| 23 | 0 | Debug | EJTAG Debug register |
| 24 | 0 | DEPC | Program counter at last EJTAG debug exception |
| 25 | 0–n | PerfCnt | Performance counter interface |
| 26 | 0 | ErrCtl | Parity/ECC error control and status |
| 27 | 0–3 | CacheErr | Cache parity error control and status |
| 28 | 0 | TagLo | Low-order portion of cache tag interface |
| 28 | 1 | DataLo | Low-order portion of cache data interface |
| 29 | 0 | TagHi | High-order portion of cache tag interface |
| 29 | 1 | DataHi | High-order portion of cache data interface |
| 30 | 0 | ErrorEPC | Program counter at last error |
| 31 | 0 | DESAVE | EJTAG debug exception save register |

Figure 2:
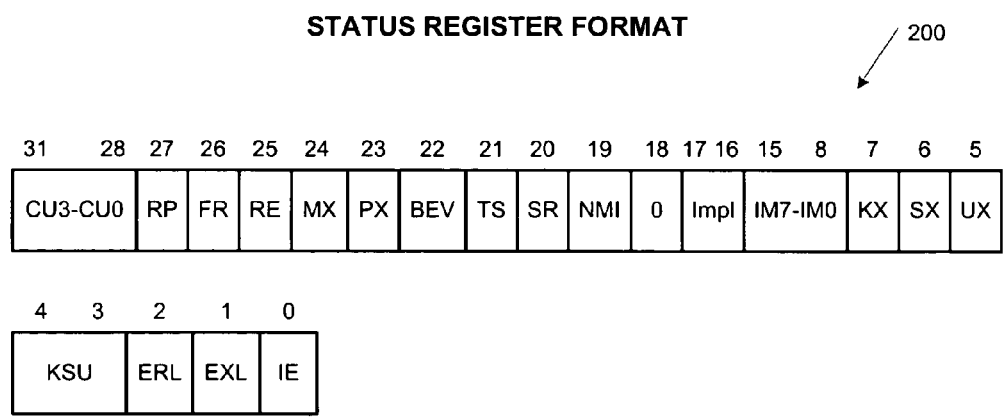
FIG. 2 is a block diagram illustrating the bits of a Coprocessor 0 status register (SR).

Of particular interest to the present invention is register number 12, called the Status Register (SR) because it is the Status Register, among others, that is referenced when servicing interrupts or exceptions. Referring to FIG. 2 a block diagram 200 is shown illustrating the bit fields within a Status Register (SR) that is located within the control registers 110 of CP0 108. For a description of each of the bit fields within the SR, reference is made to Table 2 below.

TABLE 2

| Fields | | | Read/ |
|---|---|---|---|
| Name | Bits | Description | Write |
| CU | 31:28 | Controls access to coprocessors 3, 2, 1 and 0, respectively: 0: access not allowed 1: access allowed Coprocessor 0 is always usable when the processor is running in Kernel Mode or Debug Mode, independent of the state of the $CU_0$ bit. If there is no provision for connecting a coprocessor, the corresponding CU bit must be ignored on write and read as zero. | R/W |

TABLE 2-continued

| Name | Bits | Description | Read/Write |
|------|------|-------------|------------|
| RP | 27 | Enables reduced power mode on some implementations. The specific operation of this bit is implementation dependent. If this bit is not implemented, it must be ignored on write and read as zero. If this bit is implemented, the reset state must be zero so that the processor starts at full performance. | R/W |
| FR | 26 | Controls the floating point register mode on 64-bit MIPS processors. Not used by MIPS32 processors. This bit must be ignored on write and read as zero. | R |
| RE | 25 | Used to enable reverse-endian memory references while the processor is running in user mode: 0: User mode uses configured endianness 1: User mode uses reversed endianness Neither Kernel Mode nor Supervisor Mode references are affected by the state of this bit. If this bit is not implemented, it must be ignored on write and read as zero. | R/W |
| MX | 24 | Enables access to MDMX* resources on MIPS64* processors. Not used by MIPS32* processors. This bit must be ignored on write and read as zero. | R |
| PX | 23 | Enables access to 64-bit operations on MIPS64 processors. Not used by MIPS32 processors. This bit must be ignored on write and read as zero. | R |
| BEV | 22 | Controls the location of exception vectors: 0: Normal 1: Bootstrap | R/W |
| TS | 21 | Indicates that the TLB has detected a match on multiple entries. It is implementation dependent whether this detection occurs at all, on a write to the TLB, or an access to the TLB. When such a detection occurs, the processor initiates a machine check exception and sets this bit. It is implementation dependent whether this condition can be corrected by software. If the condition can be corrected, this bit should be cleared before resuming normal operation. If this bit is not implemented, it must be ignored on write and read as zero. Software writes to this bit may not cause a 0–1 transition. Hardware may ignore software attempts to cause such a transition. | R/W |
| SR | 20 | Indicates that the entry through the reset exception vector was due to a Soft Reset: 0: Not Soft Reset (NMI or Reset) 1: Soft Reset If this bit is not implemented, it must be ignored on write and read as zero. Software may only write a zero to this bit to clear the SR condition. Hardware may ignore software attempts to write a one to this bit. | R/W |
| NMI | 19 | Indicates that the entry through the reset exception vector was due to an NMI 0: Not NMI (Soft Reset or Reset) 1: NMI If this bit is not implemented, it must be ignored on write and read as zero. Software may only write a zero to this bit to clear the NMI condition. Hardware may ignore software attempts to write a one to this bit. | R/W |
| 0 | 18 | Must be written as zero; returns zero on read | 0 |
| Impl | 17:16 | These bits are implementation dependent and not defined by the architecture. If they are not implemented, they must be ignored on write and read as zero. | |
| IM7–IM0 | 15:8 | Interrupt Mask: Controls the enabling of each of the external, internal and software interrupts. 0: interrupt request disabled 1: interrupt request enabled | R/W |
| KX | 7 | Enables access to 64-bit kernel address space on 64-bit MIPS processors. Not used by MIPS32* processors. This bit must be ignored on write and read as zero | R |
| SX | 6 | Enables access to 64-bit supervisor address space on 64-bit MIPS processors. Not used by MIPS32* processors. This bit must be ignored on write and read as zero. | R |
| UX | 5 | Enables access to 64-bit user address space on 64-bit MIPS processors. Not used by MIPS32* processors. This bit must be ignored on write and read as zero. | R |
| KSU | 4:3 | If Supervisor Mode is implemented, the encoding of this field denotes the base operating mode of the processor. The encoding of this field is: 00: Base mode is Kernel Mode 01: Base mode is Supervisor Mode 10: Base mode is User Mode 11: Reserved. The operation of the processor is UNDEFINED if this value is written to the KSU field Note: This field overlaps the UM and R0 fields, described below. | R/W |
| ERL | 2 | Error Level; Set by the processor when a Reset, Soft Reset, NMI or Cache Error exception is taken. 0: normal level 1: error level When ERL is set: The processor is running in Kernel Mode Interrupts are disabled The ERET instruction will use the return address held in ErrorEPC instead of EPC The lower $2^{29}$ bytes of kuseg are tread as an unmapped and uncached region. This allows main memory to be accessed in the presence of cache errors. The operation of the processor is UNDEFINED if the ERL bit is set while the processor is executing instructions from kuseg. | R/W |
| EXL | 1 | Exception Level; Set by the processor when any exception other than Reset, Soft Reset, NMI or cache Error exception is taken. 0: normal level 1: exception level When EXL is set: The processor is running in Kernel Mode Interrupts are disabled TLB refill exceptions will use the general exception vector instead of the | R/W |

TABLE 2-continued

| Fields | | | Read/ |
|---|---|---|---|
| Name | Bits | Description | Write |
| | | TLB refill vector. EPC and Cause$_{BD}$ will not be updated if another exception is taken | |
| IE | 0 | Interrupt Enable: Acts as the master enable for software and hardware interrupts: 0: disable interrupts 1: enables interrupts | R/W |

*Information about MIPS32, MIPS64, MDMX architecture specifications are available from MIPS Technologies, Inc of Mountain View, California.

When an interrupt occurs during execution of either a user program, or in the middle of servicing another interrupt, the CPU 102 may be required to modify bits within the SR register 200. The logical flow of such modification is shown below with reference to FIG. 3.

Figure 3:
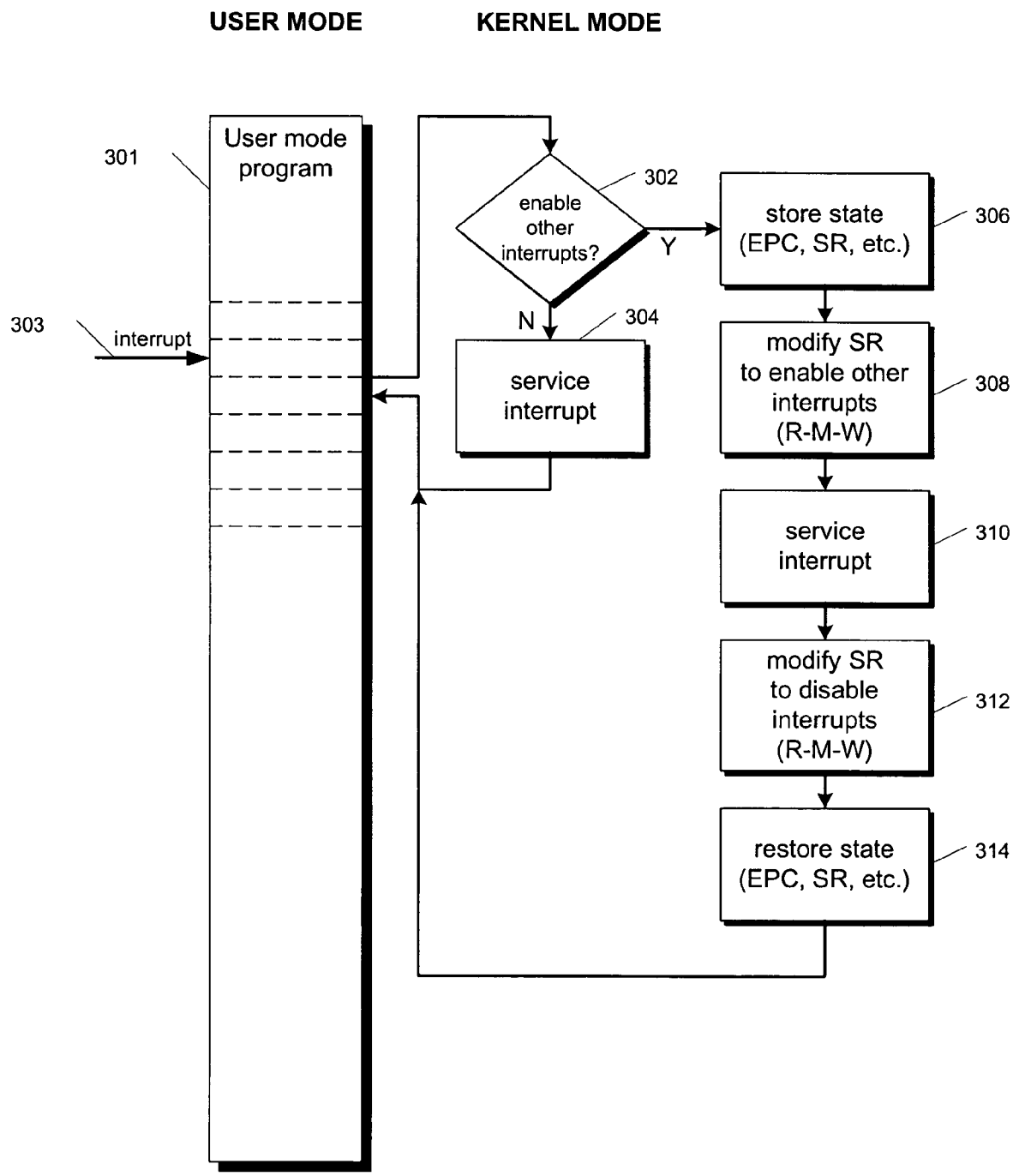
FIG. 3 is a flow chart illustrating a read-modify-write (R-M-W) sequence required for updating the status register in Coprocessor 0.

In FIG. 3, a flow chart 300 is provided that particularly illustrates program flow within the CPU 102 upon occurrence of an interrupt, per the scenario discussed briefly above in the Background. A user mode program 301 is shown executing, until an interrupt 303 occurs. One skilled in the art will appreciate that the interrupt may occur from any of a number of sources external to the CPU 102. At this point, all instructions that have successfully completed execution within the CPU 102 continue to pass thru remaining pipeline stages (not shown) within the CPU 102. However, instructions that have not yet completed execution are halted, and will be restarted upon return from the interrupt.

Within the MIPS architecture, when an interrupt occurs, the interrupt will be serviced by the CPU 102 if: 1) interrupts are enabled (the IE bit is set); 2) the mask bit (IM0–7) for the particular interrupt is set; and 3) the EXL bit is clear. Otherwise, the CPU 102 will ignore interrupts. More specifically, if the CPU 102 is in user mode, the EXL bit is clear. When an interrupt occurs, the interrupt will cause the EXL bit to be set, thereby disabling all further interrupts until the EXL bit is cleared. So, if the CPU 102 is in user mode when interrupt 303 occurs, the EXL bit is set by the interrupt, and instruction flow proceeds to decision block 302.

At decision block 302 a determination is made as to whether the interrupt will require very little processing, or significant processing (as determined from the type of interrupt). If the interrupt serviced by the routine can be completed in just a few instructions, the programmer may allow the EXL bit to remain set, thereby disabling further interrupts while servicing the interrupt. If the programmer determines that the interrupt will require very little processing, and that there is no need to re-enable other interrupts, flow proceeds to block 304. Otherwise, flow proceeds to block 306.

At block 304, the interrupt is serviced. Upon completion of servicing the interrupt, the CPU 102 executes a return from exception instruction to cause the processor to jump back to user mode where it left off. In addition, the return from exception instruction clears the EXL bit to allow interrupts.

Back at decision block 302, if the interrupt requires more significant time to process, the programmer may wish to re-enable other interrupts before proceeding with the processing. Flow therefore proceeds to block 306.

At block 306, the state of the CPU 102 is stored to memory. One skilled in the art will appreciate that the state of the processor includes the contents of the EPC register (i.e., the register holding the contents of the program counter prior to jumping to the exception handler), the SR, and possibly other state information. The state of the processor is stored prior to enabling interrupts so that if the exception routine is interrupted, and the contents of SR and/or EPC get overwritten, they may later be restored. Flow then proceeds to block 308.

At block 308 interrupts are re-enabled. To accomplish this, the programmer clears the EXL bit, and modifies the contents of the interrupt mask bits (IM0–7) to disable the interrupt bit pertaining to the present interrupt, while enabling other interrupts. Clearing and modification of bits in the SR register are not done directly. Rather, bits in status registers, such as SR, are first moved into the GPR 106, then modified, and then moved back to the SR. So, at block 308 the contents of the SR register are moved to a register within the GPR 106. Then, according to the exception handler program, particular bits within the SR are set or cleared in the copy of SR that was moved to GPR 106. Such bits include the interrupt mask bits IM0–7, the EXL bit, and possibly the interrupt enable bit (IE). After modification, the contents of the register in GPR 106 that contains the modified fields within the SR are moved back into the SR register. At this point, updating of the SR register is complete, and interrupts are re-enabled. One skilled in the art will appreciate at this point that the RMW sequence has not been interrupted because during the modification, the EXL bit is still set. Flow then proceeds to block 310.

At block 310, the service routine for the particular interrupt executes. Upon completion of servicing the interrupt, it is necessary to restore the state of the CPU 102 to the state it was in before the interrupt occurred. However, since restoring the state of the processor requires a R-M-W sequence that may itself be interrupted, interrupts are first disabled. This is shown at block 312.

At block 312, the contents of the SR register are moved to a register in the GPR 106, the interrupt enable (IE) bit is cleared thereby disabling interrupts, and the contents of the register in the GPR 106 are moved back to the SR. Once the IE bit in the SR has been cleared, the state of the CPU 102 may be restored without fear of being interrupted. Flow then proceeds to block 314.

At block 314, the state of the CPU 102 is restored. EPC is restored from memory, SR is restored from memory, and any other state information that was stored in block 306 is restored. A return from the exception places the contents of EPC into the program counter of the CPU 102 to cause instruction flow to begin again at the point of interruption.

The flow chart of FIG. 3 is provided to particularly illustrate several aspects of interrupt handling. The first is that when an interrupt occurs, a context switch is made to kernel mode within the CPU 102, unless of course the CPU 102 is already executing in kernel mode (in which case a switch is made to Kernel mode with the EXL bit being set). That is, interrupt service routines, exception handlers, etc., that require access to the control registers 110 within the CPU 102, operate in a different, i.e., higher privilege level than user programs (since user programs do not have access to the control registers 110).

In addition, when an interrupt occurs, if the service routine requires more than a few instructions to execute, the state of the processor must first be stored into memory, and interrupts re-enabled. Upon completion of servicing the interrupt, the state of the processor must be restored. However, since interrupts may still occur, interrupts must first be disabled prior to restoring the state of the processor. But, to disable interrupts, a R-M-W sequence must occur between the SR and the GPR 106, a sequence which itself might be interrupted.

Figure 4:
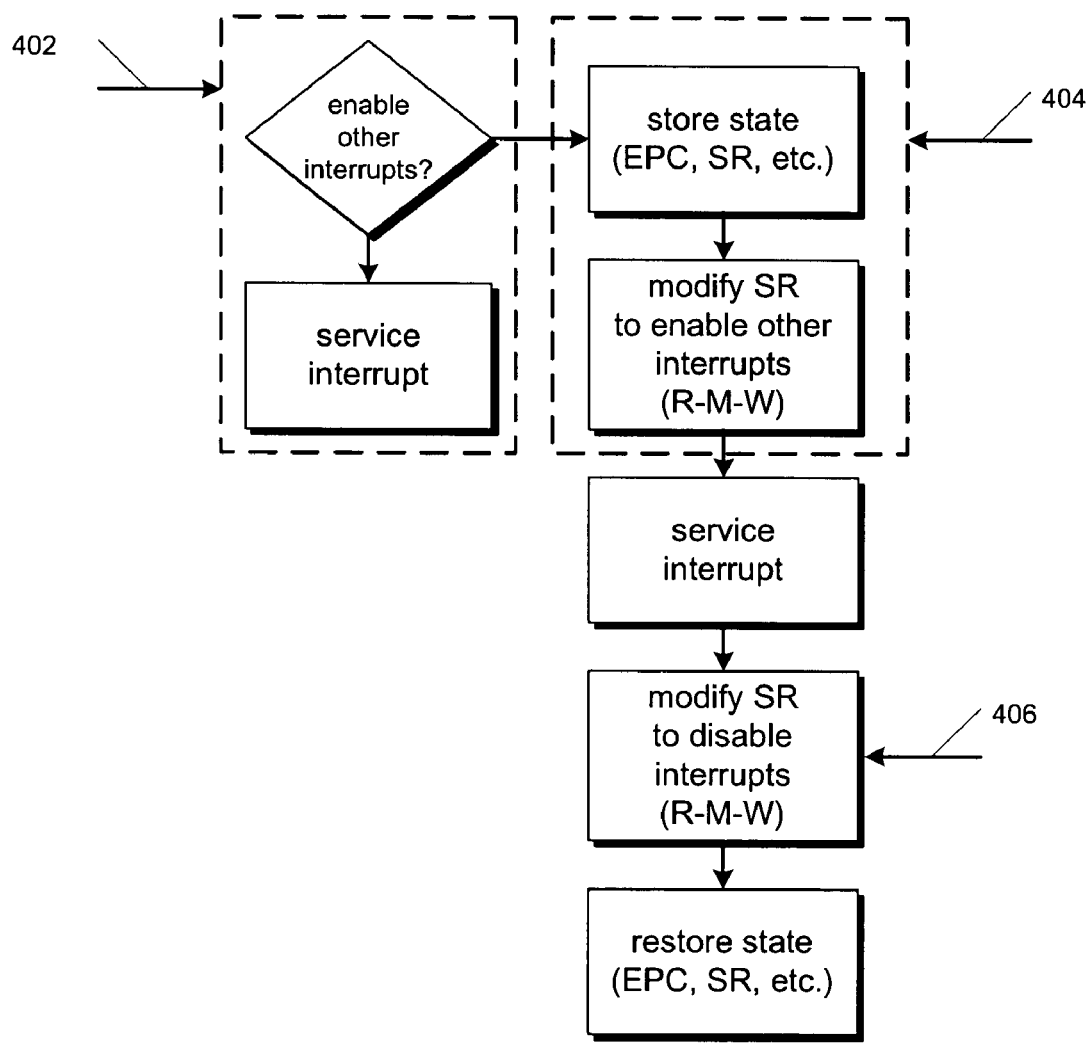
FIG. 4 is a flow chart illustrating one methodology for dealing with an interrupt during the SR update process provided in FIG. 3.

FIG. 4 provides a flow chart 400 illustrating the effect of multiple interrupts while handling the 1$^{st}$ interrupt described above in FIG. 3. Suppose an interrupt 402 occurs prior to deciding whether the 1$^{st}$ interrupt is going to be time consuming, or while handling a short interrupt. At this point, interrupt 402 will be ignored because the EXL bit remains set, thereby disabling all interrupts. Therefore, no problem occurs with respect to the state of the CPU 102, or the SR register.

Suppose an interrupt 404 occurs while the state of the CPU 102 is being saved, or while other interrupts are being enabled at block 306. At this point, the EXL bit is still set thereby disabling interrupt 404. The state of the CPU 102 is preserved, and the instruction flow that modifies the SR is preserved. Still there is no problem.

Suppose however that an interrupt 406 occurs after interrupts have been re-enabled. Recall that to insure that the CPU 102 returns to the state that it was in prior to handling the 1$^{st}$ interrupt, its state at the time of the 1$^{st}$ interrupt must be restored. The restoration of the state of the SR however is a R-M-W sequence that itself may be interrupted. That is why block 312 disables interrupts prior to restoring the state of the CPU 102. But, block 312 may itself be interrupted. If this occurs, it is possible that the state of the CPU 102 might not be restored to the condition it was in before the interrupt. Such an instance can be disastrous.

Figure 5:
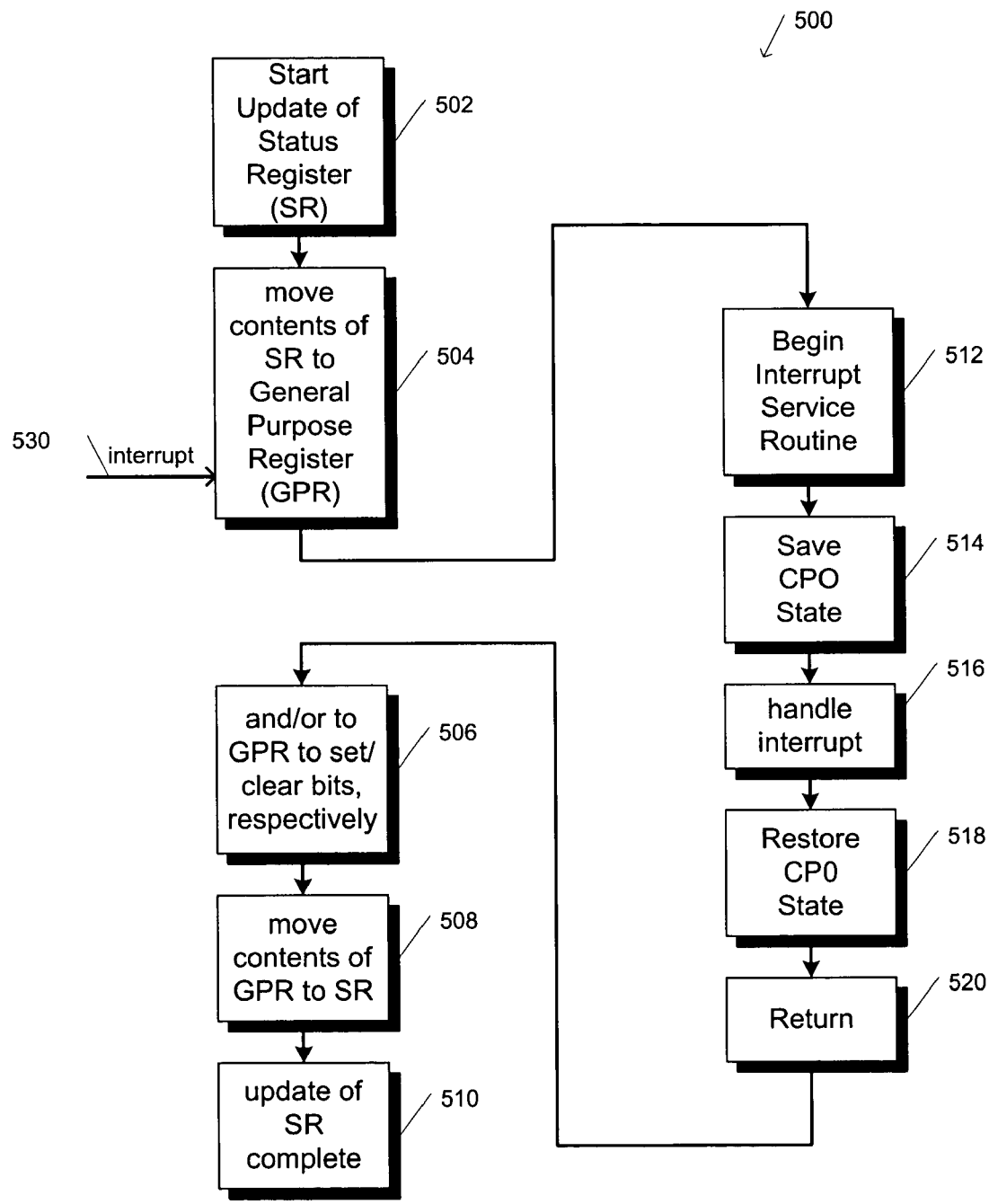
FIG. 5 is a flow chart illustrating a second methodology for dealing with an interrupt during the SR update process provided in FIG. 3.

Referring now to FIG. 5, a flow chart 500 is shown that illustrates a methodology for insuring that the R-M-W sequence of block 312 is not prevented from accomplishing its purpose completing and proceeding to block 314. More specifically, FIG. 5 illustrates a requirement that all interrupt service routines be strictly nested. That is, that all interrupts store the state of CP0 prior to proceeding, restore it upon completion, and always return to the location they interrupted.

Flow starts at block 502 where update of the SR begins (such as the disabling of interrupts by clearing the IE bit, as shown in block 312). Flow then proceeds to block 504.

At block 504, the contents of the SR register are moved to the GPR 106. At this point, an interrupt 530 occurs. Since the interrupt 530 has not been disabled, program flow jumps to an exception handler that begins an interrupt service routine, at block 512. Flow then proceeds to block 514.

At block 514, to insure that the contents of the SR are not lost, at least at the point of the interrupt, the state of the CP0 108, including the SR register, is saved. Flow then proceeds to block 516.

At block 516, the interrupt 530 is serviced by an appropriate interrupt service routine. One skilled in the art will appreciate that the interrupt service routine may change the state of the SR register. Flow then proceeds to block 518.

At block 518, the state of CP0, including the SR register is restored to the condition it was in before servicing interrupt 530. Flow then proceeds to block 520.

At block 520, a return from interrupt is executed that places program execution back in the R-M-W sequence, at block 506. Instruction flow then proceeds thru blocks 506, 508, and 510 to complete the update of the SR.

At least two aspects of the solution presented in FIG. 5 should be clear to one skilled in the art. First, the instruction flow of FIG. 5 insists that no interrupt service routine be allowed to change the contents of SR. That is, whatever else happens during servicing of an interrupt, at the end of the interrupt, the service routine must restore the contents of the SR that existed when the service routine began. As mentioned above, this imposition is unacceptable in many environments. Second, the instruction flow presented in FIG. 5 insists that all interrupt service routines be strictly nested. That is, whenever a departure in normal program flow occurs, as a result of an interrupt, the interrupt service routine is required, upon completion, to return to the point of departure. This requirement is common in some programming environments, but in many real-time environments, such as network routing, strict nesting of interrupt service routines is not desired. Moreover, in some environments, substantial program code has already been developed that does not enforce strict nesting of interrupts, and rewriting of the code to overcome the R-M-W problems described above would be too time consuming, as well as too costly.

For these reasons, the atomic update of CP0 state methodology of the present invention is desired, and will now be described with reference to FIGS. 6–8.

Figure 6:
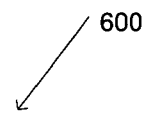
FIG. 6 is a table illustrating four instructions for atomically updating the SR of Coprocessor 0.

Referring first to FIG. 6, a table 600 is provided that illustrates four new instructions that are being added to the MIPS32 and MIPS64 architecture. The instructions include: BICC0, BISC0, DBICC0, and DBISC0. Each of these instructions, and their operation on the contents of the SR, will now be described in detail with reference to FIG. 7.

FIG. 7 provides a block diagram of the 32-bit COP0 opcodes for these four new instructions. The bit fields for the first instruction BICC0 is shown in block diagram 702.

Instruction BICC0, called Bit Clear to Coprocessor 0 is used to atomically clear bits in a coprocessor 0 register corresponding to bits that are set in a GPR. The format of the instruction is:

BICC0 rt,rd and is described as follows:

CPR[r0, rd, sel]←CPR[r0, rd, sel] and not rt

The bits set in GPR rt are used to clear the corresponding bits in the coprocessor 0 register specified in the rd and sel fields. Not all coprocessor 0 registers support the sel field. In those instances, the sel field must be zero.

The results are undefined if coprocessor 0 does not contain a register as specified by rd and sel. If access to coprocessor 0 is not enabled, a coprocessor unusable exception is signaled.

The below operation specification is for the general Move To operation with the lop field as a variable. The instruction BICC0 has a specific value for lop. The specification is:

if IsCoprocessorEnabled(0) then data←GPR [rt]

CPR[0,rd,sel]←CPR[0,rd,sel] and not [rt]

else

Signal Exception(CoprocessorUnusable, 0)

endif

Instruction BISC0, called Bit Set to Coprocessor 0 is used to atomically set bits in a coprocessor 0 register corresponding to bits that are set in a GPR. A block diagram 702 is provided illustrating the bit fields in the BISC0 instruction. The format of the instruction is:

BISC0 rt,rd and is described as follows:

CPR[r0, rd, sel]←CPR[r0, rd, sel] or rt

The bits set in GPR rt are used to set the corresponding bits in the coprocessor 0 register specified in the rd and sel fields. Not all coprocessor 0 registers support the sel field. In those instances, the sel field must be zero.

The results are undefined if coprocessor 0 does not contain a register as specified by rd and sel. If access to coprocessor 0 is not enabled, a coprocessor unusable exception is signaled.

The below operation specification is for the general Move To operation with the lop field as a variable. The instruction BICC0 has a specific value for lop. The specification is:

if IsCoprocessorEnabled(0) then
    data←GPR [rt]
    CPR[0,rd,sel]←CPR[0,rd,sel] and not [rt]
else
    Signal Exception(CoprocessorUnusable, 0)
endif Instruction DBICC0, called Double Bit Clear to Coprocessor 0 is used to atomically clear bits in a coprocessor 0 register corresponding to bits that are set in a GPR. A block diagram 704 is provided illustrating the bit fields in the DBICC0 instruction. The format of the instruction is:

DBICC0 rt,rd
DBICC0 rt,rd,sel and is described as follows:

CPR[r0, rd, sel]←CPR[r0, rd, sel] and not rt

The bits set in GPR rt are used to clear the corresponding bits in the coprocessor 0 register specified in the rd and sel fields. Not all coprocessor 0 registers support the sel field. In those instances, the sel field must be zero.

The results are unpredictable if coprocessor 0 does not contain a register as specified by rd and sel, or if the coprocessor 0 register specified by rd and sel is a 32-bit register. If access to coprocessor 0 is not enabled, a coprocessor unusable exception is signaled. If access to coprocessor 0 is enabled but access to 64-bit operations is not enabled, a Reserved Instruction Exception is signaled.

The below operation specification is for the general Doubleword Move To operation with the lop field as a variable. The instruction DBICC0 has a specific value for lop. The specification is:

if IsCoprocessorEnabled(0) then
    if(not Are64 bitOperationsEnabled( )) then SignalException(ReservedInstruction)
    endif
    datadoubleword←GPR [rt]
    CPR[0,rd,sel]←CPR[0,rd,sel] and not datadoubleword
else
    Signal Exception(CoprocessorUnusable, 0)
endif Instruction DBISC0, called Double Set Clear to Coprocessor 0 is used to atomically set bits in a coprocessor 0 register corresponding to bits that are set in a GPR. A block diagram 706 is provided illustrating the bit fields in the DBISC0 instruction. The format of the instruction is:

DBISC0 rt,rd
DBISC0 rt,rd,sel and is described as follows:

CPR[r0, rd, sel]←CPR[r0, rd, sel] or rt

The bits set in GPR rt are used to set the corresponding bits in the coprocessor 0 register specified in the rd and sel fields. Not all coprocessor 0 registers support the sel field. In those instances, the sel field must be zero.

The results are unpredictable if coprocessor 0 does not contain a register as specified by rd and sel, or if the coprocessor 0 register specified by rd and sel is a 32-bit register. If access to coprocessor 0 is not enabled, a coprocessor unusable exception is signaled. If access to coprocessor 0 is enabled but access to 64-bit operations is not enabled, a Reserved Instruction Exception is signaled.

The below operation specification is for the general Doubleword Move To operation with the lop field as a variable. The instruction DBISC0 has a specific value for lop. The specification is:

if IsCoprocessorEnabled(0) then
    if(not Are64 bitOperationsEnabled( )) then SignalException(ReservedInstruction)
    endif
    datadoubleword←GPR[rt]
    CPR[0,rd,sel]←CPR[0,rd,sel] and not datadoubleword
else
    Signal Exception(CoprocessorUnusable, 0)
endif The above discussion of FIG. 7, describes the operation of each of the CP0 atomic update instructions of the present invention. To better comprehend the application of these instructions, within the context of an interrupt, reference is now directed to FIG. 8.

Figure 8:
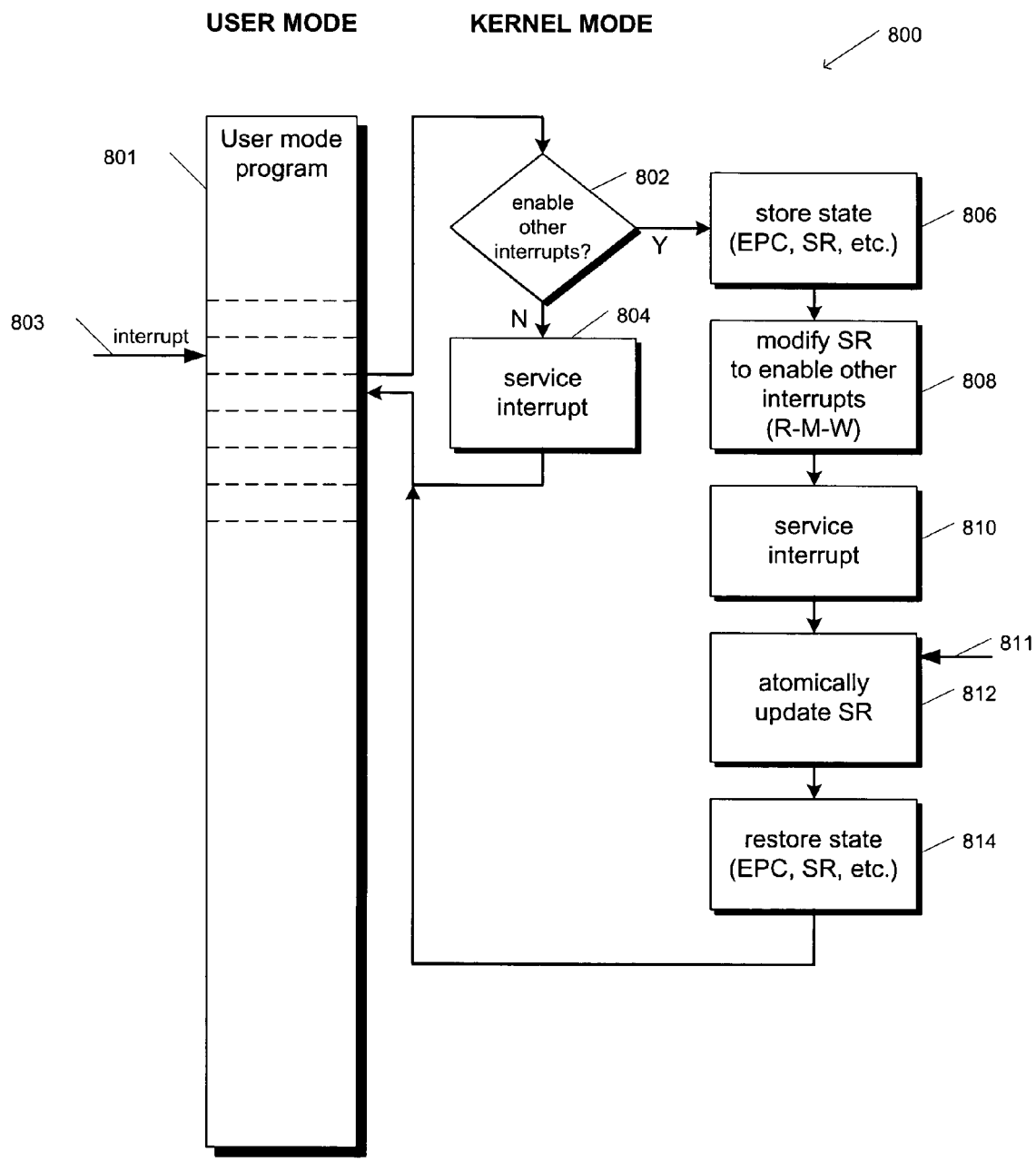
FIG. 8 is a flow chart illustrating the impact of an interrupt receiving during an atomic update of the SR using the atomic update instructions illustrated in FIGS. 6 and 7.

FIG. 8 provides a flow chart 800 that illustrates the benefit of the atomic update instructions to modify the state of the SR register, particularly when disabling interrupts by clearing the IE bit. During execution of a user program 801, an interrupt 803 occurs. Instruction flow jumps to an exception handler responsible for handling the interrupt 803. Instruction flow proceeds similarly to that described above with reference to FIG. 3. However, at block 812, one of the atomic update instructions described above with reference to FIGS. 6 and 7 is used to update the contents of SR, without requiring the R-M-W sequence described above. For example, an atomic update instruction could be used to atomically clear the IE bit in the SR register, thereby atomically disabling interrupts. Thus, when the interrupt 811 occurs during execution of block 812, it is not serviced because interrupts will have already been disabled by the atomic instruction.

More generally, depending on whether an exception handler wishes to set or clear bits in the SR, and whether the CPU 102 is operating in 32-bit or 64-bit mode, the exception handler utilizes one of the four instructions shown in FIG. 6. If the programmer of the exception handler wishes to set bits in the SR, s/he will use either the BISC0 or DBSC0 instruction. If the programmer wishes to clear bits in the SR, s/he will use either the BICC0 or DBICC0 instruction. The particular bits that will be set or cleared will be based on a bit mask stored in one of the registers in the GPR 106.

One skilled in the art will appreciate that since selected bit fields in the SR register, or any other of the control registers 110, are set atomically (i.e., within a single cycle), there is no requirement that interrupt service routines be strictly nested. Nor is there any requirement that interrupts be disabled during modification of any of the control registers, such as when restoring the state of the CPU 102. Thus, the present invention imposes none of the previous limitations relating to interrupt handling (e.g., disabling of interrupts, strict nesting of interrupt service routines, etc.), while enhancing a kernel programs ability to modify selected control registers 110 without a R-M-W sequence. Furthermore, when modification of a control register 110 is desired, it may be accomplished more efficiently since such modification requires only a single processing cycle.

Although the present invention and its objects, features, and advantages have been described in detail, other embodiments are encompassed by the invention. In addition to implementations of the invention using hardware, the invention can be embodied in software disposed, for example, in a computer usable (e.g., readable) medium configured to store the software (i.e., a computer readable program code).

The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core (e.g. a microprocessor core) that is embodied in program code and may be transformed to hardware as part of the production of integrated circuits. Also, the invention may be embodied as a combination of hardware and software.

Also, although the coprocessor interface has been described with particular reference to MIPS32 and MIPS64 Instruction Set Architecture, one skilled in the art will appreciate that the applicability of the atomic update of privileged resources is not limited to such architecture.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A microprocessor having a control register that is atomically modifiable by a privileged (kernel) instruction, the control register having bit fields, the microprocessor comprising:
    a core, for receiving the privileged instruction and for atomically modifying the control register upon execution of the privileged instruction, wherein the control register is not accessible when the microprocessor is executing unprivileged instructions;
    the privileged instruction comprising:
        an opcode, for identifying the instruction as a privileged instruction;
        a first operand, for specifying the control register as a register to be modified; and
        a second operand, for specifying a location of a second register within the microprocessor, said second register containing a bit mask, said bit mask determining which of the bit fields within the control register are to be modified;
        wherein said bit mask is used to atomically set or clear the bit fields in the control register;
    whereby the bit fields in the control register are modified atomically by the privileged instruction.

2. The microprocessor as recited in claim 1, wherein the control register is modified by the privileged instruction in a single cycle.

3. The microprocessor as recited in claim 1 wherein the control register is directly modified by the privileged instruction without requiring the contents of the control register to first be moved to a general purpose (i.e., non-privileged) register.

4. The microprocessor as recited in claim 1 wherein the privileged instruction is executed when the microprocessor receives an interrupt signal.

5. The microprocessor as recited in claim 1 wherein the privileged instruction comprises:
    a first instruction, for setting bit fields in the control register according to the contents of said bit mask; or
    a second instruction, for clearing bit fields in the control register according to the contents of said bit mask.

6. The microprocessor as recited in claim 5 wherein said first instruction sets bit fields in the control register pertaining to corresponding bits that are set in said bit mask.

7. The microprocessor as recited in claim 5 wherein said second instruction clears bit fields in the control register pertaining to corresponding bits that are set in said bit mask.

8. The microprocessor as recited in claim 1 wherein said second register comprises a general purpose register.

9. The microprocessor as recited in claim 1 wherein the privileged instruction further comprises a field for specifying whether the bit fields in the control register are to be set or cleared according to said bit mask.

10. The microprocessor as recited in claim 1 wherein the control register comprises:
    an interrupt mask bit field, said interrupt mask bit field having a plurality of bits, each of said plurality of bits for identifying interrupts received by the microprocessor.

11. The microprocessor as recited in claim 10 wherein by atomically clearing one of said plurality of bits using the privileged instruction, its corresponding interrupt is temporarily disabled.

12. A method for atomically modifying bits within a privileged control register of a microprocessor, the method comprising:
    providing a privileged instruction which instructs the microprocessor to atomically modify specified ones of the bits, wherein the control register is not accessible when the microprocessor is executing unprivileged instructions;
    providing a register, for specifying which of the particular ones of the bits are to be modified; and
    upon receipt of an interrupt by the microprocessor, atomically clearing the particular ones of the bits as specified by the register.

13. The method as recited in claim 12 wherein the bits specify which of a plurality of interrupts have been received by the microprocessor.

14. The method as recited in claim 12 wherein the bits specify which of a plurality of interrupts are enabled.

15. The method as recited in claim 12 wherein the privileged control register comprises a status register having a plurality of bit fields, including the bits.

16. The method as recited in claim 12 wherein the privileged instruction comprises:
    an opcode for designating the privileged instruction as privileged;
    a first operand for designating the privileged control register as the register to be modified; and
    a second operand for designating the location of the register.

17. A tangible computer readable medium comprising program instructions executable by a microprocessor, wherein the program instructions include program code for receiving and executing a privileged instruction, wherein when executed the privileged instruction is operable to:

modify a control register of the microprocessor, wherein the control register is not accessible when the microprocessor is executing unprivileged instructions;

wherein the privileged instruction comprises:
- an opcode, for identifying the instruction as a privileged instruction;
- a first operand, for specifying the control register as a register to be modified; and
- a second operand, for specifying a location of a second register within the microprocessor, said second register containing a bit mask, said bit mask determining which of the bit fields within the control register are to be modified;

wherein said bit mask is used to set or clear the bit fields in the control register;

whereby the bit fields in the control register are modified atomically by the privileged instruction.

18. The tangible computer readable medium as recited in claim 17 wherein the privileged instruction is executed when the microprocessor receives an interrupt signal.

19. The tangible computer readable medium as recited in claim 17 wherein the privileged instruction clears bit fields in the control register pertaining to corresponding bits that are set in said bit mask.

20. The method as recited in claim 12, wherein the control register is modified by the privileged instruction in a single cycle.

21. The tangible computer readable medium as recited in claim 17, wherein when executed, the privileged instruction is configured to modify the control register in a single cycle.

* * * * *